(12) United States Patent
Vasudevan et al.

(10) Patent No.: US 12,019,659 B2
(45) Date of Patent: Jun. 25, 2024

(54) METHOD AND SYSTEM TO OPTIMIZE A PLURALITY OF TOPICS BY EVALUATION METRICS

(71) Applicant: Tata Consultancy Services Limited, Mumbai (IN)

(72) Inventors: Bagya Lakshmi Vasudevan, Chennai (IN); Lavanya Gunasekar, Chennai (IN); Ananya Srivastava, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 18/110,946

(22) Filed: Feb. 17, 2023

(65) Prior Publication Data
US 2023/0267136 A1 Aug. 24, 2023

(30) Foreign Application Priority Data
Feb. 21, 2022 (IN) .............................. 202221009156

(51) Int. Cl.
*G06F 16/31* (2019.01)
(52) U.S. Cl.
CPC ................. *G06F 16/313* (2019.01)
(58) Field of Classification Search
CPC .................................................. G06F 16/313
See application file for complete search history.

(56) References Cited

U.S. PATENT DOCUMENTS

| 7,774,198 B2 * | 8/2010 | Roulland .............. G06F 40/211 707/765 |
| 8,494,987 B2 | 7/2013 | Katukuri et al. |
| 9,020,804 B2 | 4/2015 | Barbaiani et al. |
| 9,443,005 B2 | 9/2016 | Khandekar |
| 2019/0087405 A1 | 3/2019 | Hollingsworth |

* cited by examiner

*Primary Examiner* — Baoquoc N To
(74) *Attorney, Agent, or Firm* — FINNEGAN, HENDERSON, FARABOW, GARRETT & DUNNER LLP

(57) ABSTRACT

Rapid development in digitization results in generation of huge amounts of unstructured text data by most organizations from several sources. A major drawback of using existing metrics in the data management is assessing quality of topics associated with context in a document. A processed dataset obtained from a raw dataset is mapped to obtain a relationship between one or more words from one or more topics. A word score is determined based on probability of number of constructs in sentences. At least one repetitive word from the one or more topics are determined. A topic score with degree of contextual association between the one or more words in each topic is determined by mean value of the word score. A contiguity score with degree of contextual association between the one or more topics is determined based on median value of the topic score to obtain one or more connected topics.

15 Claims, 5 Drawing Sheets

"THE COLOR PAYOFF IS SO WEAK THAT NO MATTER HOW MUCH YOU BUILD IT. IT IS GREY AND STREAKY, YOU WILL GET A NICE SMEAR ACROSS YOUR TOP LID, ......................"

FIG. 3A

TOPIC #0:

['GOOD', 'FIT', 'GREAT', 'LOOK', 'COLOUR', 'COMFORTABLE', 'WEAR', 'LOVELY', 'BUY', 'VALUE']

TOPIC #1:

['WEAR', 'BUY', 'GOOD', 'COMFORTABLE', 'LOVE', 'LOOK', 'BOOT', 'COMFY', 'SHOE', 'WARM']

TOPIC #2:

['COMFORTABLE', 'BUY', 'GREAT', 'LOVE', 'COLOUR', 'FIT', 'GREAT', 'SOFT', 'WEAR', 'WASH']

TOPIC #3:

['WEAR', 'BUY', 'LOOK', 'LOVE', 'MAKE', 'GOOD', 'DAUGHTER', 'PRESENT', 'SHOE']

FIG. 3B

METHOD AND SYSTEM TO OPTIMIZE A PLURALITY OF TOPICS BY EVALUATION METRICS

PRIORITY CLAIM

This U.S. patent application claims priority under 35 U.S.C. § 119 to: India Application No. 202221009156, filed on 21 Feb. 2022. The entire contents of the aforementioned application are incorporated herein by reference.

TECHNICAL FIELD

This disclosure relates generally to data management, and, more particularly, to a method and system to optimize a plurality of topics by evaluation metrics.

BACKGROUND

In recent times, data volume is growing bigger and bigger with a rapid development of digitization. A huge amount of an unstructured text data is generated by most organizations from several sources. One of the major drawbacks with existing approaches for data management is an inability to capture a context, i.e., a relationship between words is not captured in a subset of words or topics in a document. Text mining is a strategy for extracting a meaningful information or one or more insights from the unstructured data. The text mining is used across several industries to understand context, and to enhance decision-making. Topic modeling is a technique for text mining, and an unsupervised technique in natural language processing (NLP). The topic modeling extracts main topics which are represented as a set of words that occur in collection of documents. Evaluating topic models is a difficult task to perform, because an optimized value for 'number of topics (k)' in a document to be known. Even though there are various approaches available, but best results come from human interpretation which is time-consuming and unreliable. In recent years, for the set of words or topics, different word similarities have been used. Evaluation measures such as coherence formulas i.e., a coherence score for identifying the best tokens from collection of words, and a perplexity score to compare one or more models.

The coherence score provides a measure of how often words support each other in a document or how often two words appear in a corpus. Topics are not assured to be well interpretable, therefore, coherence measures have been proposed to distinguish between good and bad topics. Studies of topic coherence so far are limited to measuring the score for pairs of individual words. The fact is not considered how well derived topics i.e., top words are interpreted by a user. Topic models have been combined with the coherence measures by introducing specific priors on topic distributions. There is no way to determine whether the coherence score is good or bad. The coherence score and corresponding value depend on the data that is in a manipulated form. The topic coherence measures a single topic score by measuring a degree of semantic similarity between high scoring words in the topic. These measurements help distinguish between semantically interpretable topics and topics that are artifacts of a statistical inference. If the number of topics increases, the coherence score increases, resulting in repeated keywords in the topic. The topic coherence is an intrinsic measure of a 'gensim' application programming interface (API) which cannot be used for other outcomes generated with different APIs.

In the natural language processing (NLP), the perplexity score is applied to measure or evaluate how well one or more topic models are predicting. The perplexity score as well is one of an intrinsic validation metrics and widely used for language model evaluation. The perplexity score which measures how unseen data that are learned in the model are feasible. To say, how well does the model represent or reproduce statistics of a held-out data. Most common way to evaluate a probabilistic model is to measure the log-likelihood of the held-out data which are mostly utilized for LDA models. However, recent studies have shown that predictive likelihood (or equivalently, perplexity) and human judgment are often not correlated, and even sometimes slightly anti-correlated. Optimizing for perplexity may not yield user interpretable topics i.e., human interpretable topics. The coherence score and the perplexity score are statistical metric which has restrictions with limited API and algorithms. Therefore, these metrics are not sufficient and act as bad indicators for assessing the quality of one or more topics.

SUMMARY

Embodiments of the present disclosure present technological improvements as solutions to one or more of the above-mentioned technical problems recognized by the inventors in conventional systems. For example, in one aspect, a processor implemented method of optimizing one or more topics by evaluation metrics is provided. The processor implemented method includes at least one of: receiving, via one or more hardware processors, a processed dataset obtained from a raw dataset as an input; mapping, via the one or more hardware processors, the raw dataset, and the processed dataset to obtain a relationship between one or more tokens from one or more topics (k); generating, by a parsing unit, one or more constructs in one or more sentences from the raw dataset; determining, via the one or more hardware processors, a word score based on a probability of a number of constructs; determining, via the one or more hardware processors, a litany index value for each topic of the one or more topics (k); determining, via the one or more hardware processors, a topic score for each topic based on a mean value of the word score subtracted by the corresponding litany index value for each topic; and obtaining, via the one or more hardware processors, one or more connected topics from the one or more topics (k) based on a contiguity score. The processed dataset corresponds to one or more topic models. The one or more topic models include the one or more topics (k). The one or more tokens corresponds to one or more words (n) present in the one or more sentences from the raw dataset. The one or more constructs corresponds to one or more closely connected entity. The number of constructs includes one or more paired tokens. The litany index value corresponds to one or more repetitive tokens in each topic of the one or more topics (k). The topic score corresponds to a degree of contextual association between the one or more tokens in each topic.

In an embodiment, the one or more closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*). In an embodiment, the one or more paired tokens include each token listed with other token at each topic. In an embodiment, the litany index value is proportional to number of one or more repetitive tokens. In an embodiment, the number of one or more repetitive tokens is high if the litany index value is high. In an embodiment, the contiguity score is determined based on a median value of the topic score. In an embodiment, the contiguity score corresponds to a degree of contextual association between the one or more topics (k).

In another aspect, there is provided a system for optimization of one or more topics by evaluation metrics. The system includes a memory storing instructions; one or more communication interfaces; and one or more hardware processors coupled to the memory via the one or more communication interfaces, wherein the one or more hardware processors are configured by the instructions to: receive, a processed dataset obtained from a raw dataset as an input; map, the raw dataset, and the processed dataset to obtain a relationship between one or more tokens from one or more topics (k); generate, by a parsing unit, one or more constructs in one or more sentences from the raw dataset; determine, a word score based on a probability of a number of constructs; determine, a litany index value for each topic of the one or more topics (k); determine, a topic score for each topic based on a mean value of the word score subtracted by the corresponding litany index value for each topic; and obtain, one or more connected topics from the one or more topics (k) based on a contiguity score. The processed dataset corresponds to one or more topic models. The one or more topic models include the one or more topics (k). The one or more tokens corresponds to one or more words (n) present in the one or more sentences from the raw dataset. The one or more constructs corresponds to one or more closely connected entity. The number of constructs includes one or more paired tokens. The litany index value corresponds to one or more repetitive tokens in each topic of the one or more topics (k). The topic score corresponds to a degree of contextual association between the one or more tokens in each topic.

In an embodiment, the one or more closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*). In an embodiment, the one or more paired tokens include each token listed with other token at each topic. In an embodiment, the litany index value is proportional to number of one or more repetitive tokens. In an embodiment, the number of one or more repetitive tokens is high if the litany index value is high. In an embodiment, the contiguity score is determined based on a median value of the topic score. In an embodiment, the contiguity score corresponds to a degree of contextual association between the one or more topics (k).

In yet another aspect, there are provided one or more non-transitory machine readable information storage mediums comprising one or more instructions which when executed by one or more hardware processors causes at least one of: receiving, a processed dataset obtained from a raw dataset as an input; mapping, the raw dataset, and the processed dataset to obtain a relationship between one or more tokens from one or more topics (k); generating, by a parsing unit, one or more constructs in one or more sentences from the raw dataset; determining, a word score based on a probability of a number of constructs; determining, a litany index value for each topic of the one or more topics (k); determining, a topic score for each topic based on a mean value of the word score subtracted by the corresponding litany index value for each topic; and obtaining, one or more connected topics from the one or more topics (k) based on a contiguity score. The processed dataset corresponds to one or more topic models. The one or more topic models include the one or more topics (k). The one or more tokens corresponds to one or more words (n) present in the one or more sentences from the raw dataset. The one or more constructs corresponds to one or more closely connected entity. The number of constructs includes one or more paired tokens. The litany index value corresponds to one or more repetitive tokens in each topic of the one or more topics (k). The topic score corresponds to a degree of contextual association between the one or more tokens in each topic.

In an embodiment, the one or more closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*). In an embodiment, the one or more paired tokens include each token listed with other token at each topic. In an embodiment, the litany index value is proportional to number of one or more repetitive tokens. In an embodiment, the number of one or more repetitive tokens is high if the litany index value is high. In an embodiment, the contiguity score is determined based on a median value of the topic score. In an embodiment, the contiguity score corresponds to a degree of contextual association between the one or more topics (k).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3A and FIG. 3B are exemplary schematic diagrams illustrating a raw dataset and a processed dataset respectively, according to an embodiment of the present disclosure.

DETAILED DESCRIPTION

Figure 1:
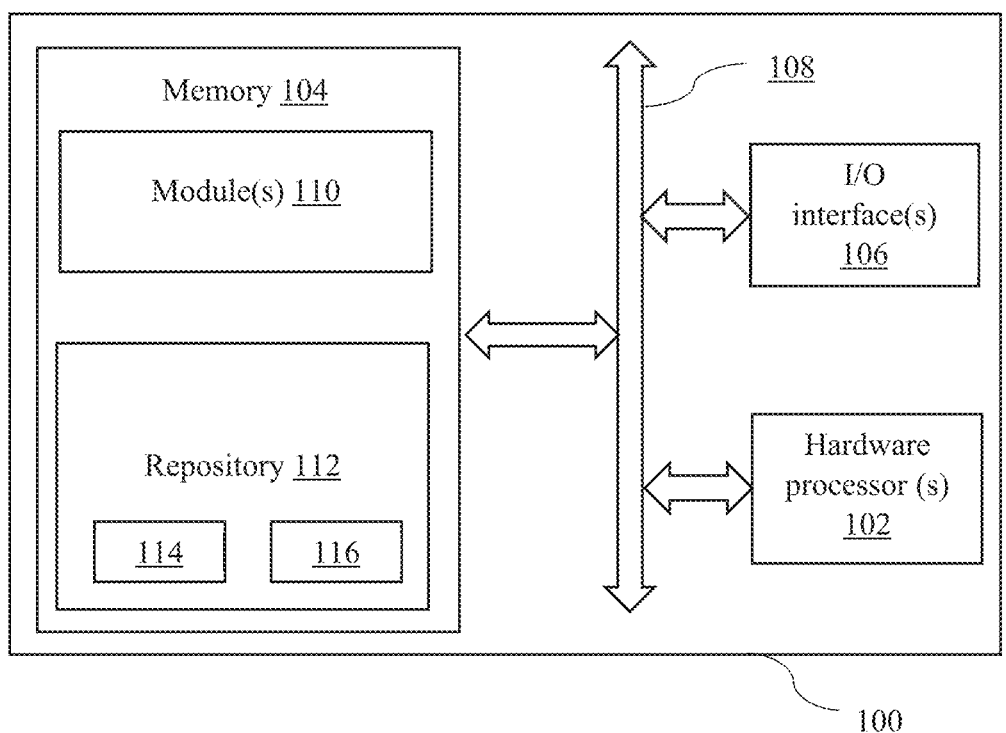
FIG. 1 illustrates a system to optimize one or more topics by evaluation metrics, according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

There is a need for evaluation metrics to determine well-connected topics. The present disclosure provides a method and system for optimizing a plurality of topics to determine one or more closely connected topics by the evaluation metrics. A topic model is considered as an input. The topic model is generated using an application programming interface (API) (e.g., gensim, and sklearn) with one or more algorithms but not limited to a probability based statistical model (e.g., Latent Dirichlet allocation (LDA)), a matrix factorization model 1 (e.g., Non-negative Matrix Factorization (NMF)), a matrix factorization model 2 (e.g., Singular value decomposition (SVD)), and a semantic analysis model (e.g., Latent Semantic Indexing (LSI)) etc. A topic score is calculated for each topic by pairing one or more words in each topic. A contiguity score is manipulated by taking a median value of the topic score. If the contiguity score is high, then the words are closely related, and connected topics are determined with respect to a context.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates a system to 100 optimize one or more topics by evaluation metrics, according to an embodiment of the present disclosure. In an embodiment, the system 100 includes one or more processor(s) 102, communication interface device(s) or input/output (I/O) interface(s) 106, and one or more data storage devices or memory 104 operatively coupled to the one or more processors 102. The memory 104 includes a database. The one or more processor(s) processor 102, the memory 104, and the I/O interface(s) 106 may be coupled by a system bus such as a system bus 108 or a similar mechanism. The one or more processor(s) 102 that are hardware processors can be implemented as one or more microprocessors, microcomputers, microcontrollers, digital signal processors, central processing units, state machines, logic circuitries, and/or any devices that manipulate signals based on operational instructions. Among other capabilities, the one or more processor(s) 102 is configured to fetch and execute computer-readable instructions stored in the memory 104. In an embodiment, the system 100 can be implemented in a variety of computing systems, such as laptop computers, notebooks, hand-held devices, workstations, mainframe computers, servers, a network cloud, and the like.

The I/O interface device(s) 106 can include a variety of software and hardware interfaces, for example, a web interface, a graphical user interface, and the like. The I/O interface device(s) 106 may include a variety of software and hardware interfaces, for example, interfaces for peripheral device(s), such as a keyboard, a mouse, an external memory, a camera device, and a printer. Further, the I/O interface device(s) 106 may enable the system 100 to communicate with other devices, such as web servers and external databases. The I/O interface device(s) 106 can facilitate multiple communications within a wide variety of networks and protocol types, including wired networks, for example, local area network (LAN), cable, etc., and wireless networks, such as Wireless LAN (WLAN), cellular, or satellite. In an embodiment, the I/O interface device(s) 106 can include one or more ports for connecting a number of devices to one another or to another server.

The memory 104 may include any computer-readable medium known in the art including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes. In an embodiment, the memory 104 includes a plurality of modules 110 and a repository 112 for storing data processed, received, and generated by the plurality of modules 110. The plurality of modules 110 may include routines, programs, objects, components, data structures, and so on, which perform particular tasks or implement particular abstract data types.

Further, a database in the repository 112 stores information pertaining to inputs fed to the system 100 and/or outputs generated by the system (e.g., data/output generated at each stage of the data processing) 100, specific to the methodology described herein. More specifically, the database stores information being processed at each step of the proposed methodology.

Additionally, the plurality of modules 110 may include programs or coded instructions that supplement applications and functions of the system 100. The repository 112, amongst other things, includes a system database 114 and other data 116. The other data 116 may include data generated as a result of the execution of one or more modules in the plurality of modules 110. Further, the database stores information pertaining to inputs fed to the system 100 and/or outputs generated by the system (e.g., at each stage), specific to the methodology described herein. Herein, the memory for example the memory 104 and the computer program code configured to, with the hardware processor for example the processor 102, causes the system 100 to perform various functions described herein under.

Figure 2:
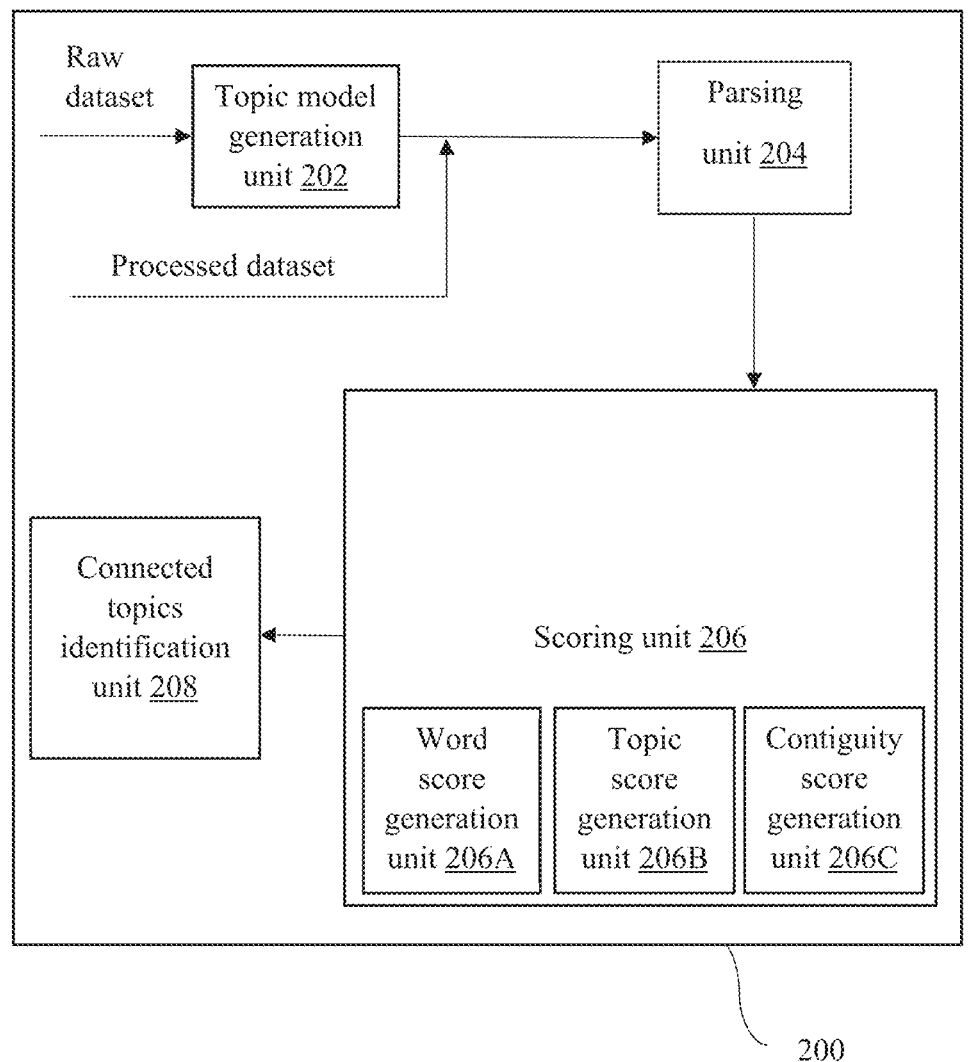
FIG. 2 illustrates an exemplary block diagram of the system of FIG. 1, according to an embodiment of the present disclosure.
Figure 4:
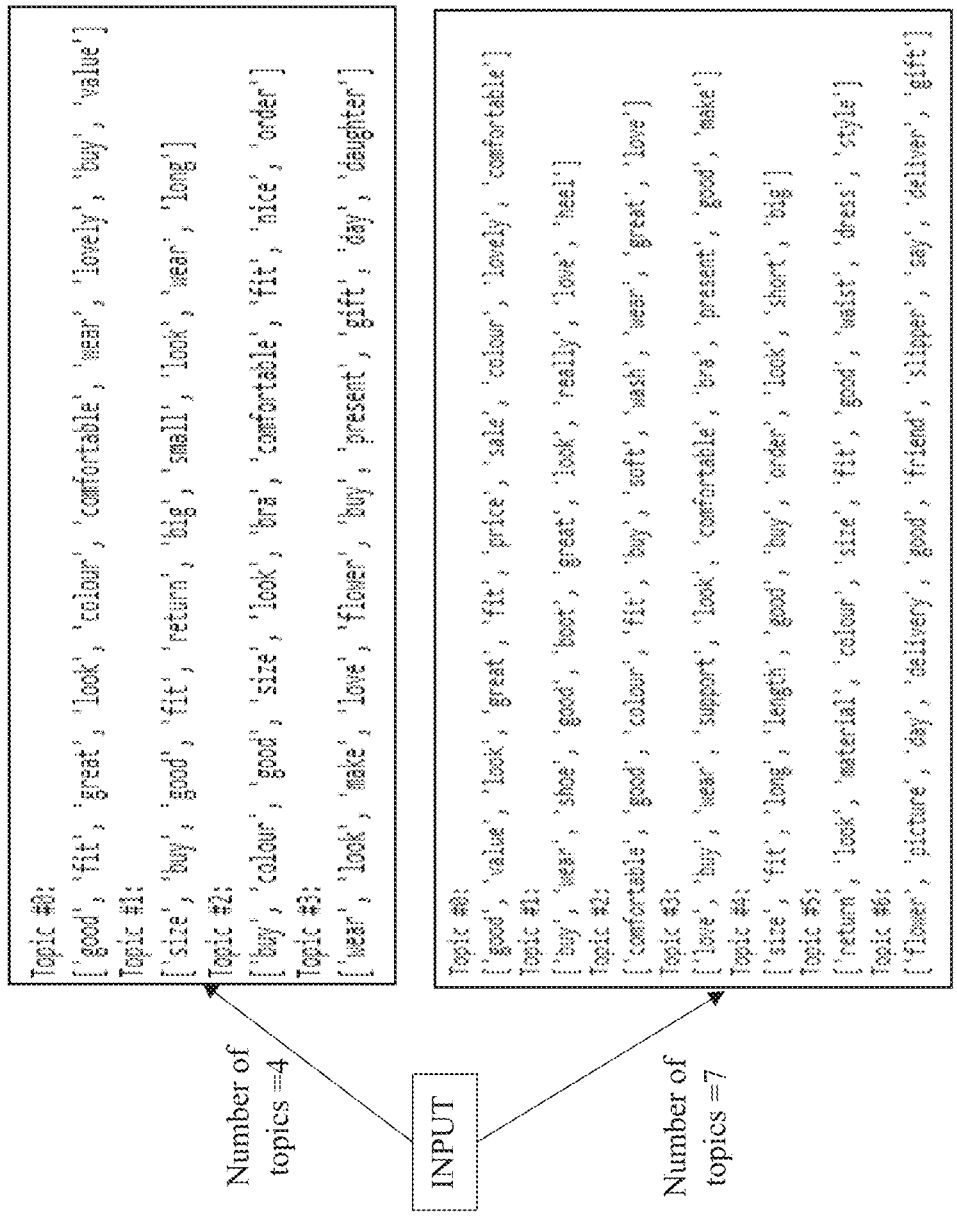
FIG. 4 is an exemplary schematic diagram illustrating number of topics generated by a topic modelling, according to an embodiment of the present disclosure.

FIG. 2 illustrates an exemplary block diagram of the system 100 of FIG. 1, according to some embodiments of the present disclosure. FIG. 3A and FIG. 3B are exemplary schematic diagrams illustrating a raw dataset and a processed dataset respectively, according to an embodiment of the present disclosure. FIG. 4 is an exemplary schematic diagram illustrating a number of topics generated by a topic modelling, according to an embodiment of the present disclosure. The system 200 may be an example of the system 100 (FIG. 1). In an example embodiment, the system 200 may be embodied in, or is in direct communication with the system, for example the system 100 (FIG. 1). The system 200 includes a topic model generation unit 202, a parsing unit 204, a scoring unit 206, and a connected topics identification unit 208. The topic model generation unit 202 is configured to generate the processed data set (as depicted in FIG. 3B) from the raw data set (as depicted in FIG. 3A). The processed dataset corresponds to one or more topic models. The one or more topic models includes one or more topics (k) (as depicted in FIG. 3B). In an embodiment, the one or more topic models are generated by using a topic modeling but not limited to one or more algorithms irrespective of APIs. The raw dataset and the processed dataset are mapped to obtain a relationship between each token and each topic from the one or more topics (k). The one or more tokens corresponds to one or more words (n) present in one or more sentence from the raw dataset. For example, an output from the topic modelling includes "k"=number of topics, "n"=number of words in each topic.

The parsing unit 204 is configured to generate one or more constructs in the one or more sentences from the raw dataset. In an embodiment, a customized noun phrase chunker is developed using a parser for producing the one or more constructs. The one or more constructs corresponds to one or more closely connected entity. In an embodiment, the customized noun phrase chunker stimulates to estimate an elevated score for optimal topics. The parsing unit 204 can identify each token, and tag part of speech of each token based on a relationship to other tokens in a first sentence, and properly chunk the tokens into phrases. For example, one or more closely connected entity:

"NP: {<VB.*|CD|CC|RB. *|RP|TO|IN|JJ. *|POS|PRP. *|PRP\$|NN. *>*}"

where VB*—verb, CC—conjunction, CD—cardinal number, RB—adverb, RP—particle, IN—preposition, TO—to, POS—possessive ending, JJ*—adjective, PRP—personal pronoun, NN*—noun.

The one or more constructs=['color payoff weak,', 'grey streaky', 'nice smear lid', . . . ].

The scoring unit 206 further includes a word score generation unit 206A, a topic score generation unit 206B, and a contiguity score generation unit 206C. The word score generation unit 206A is configured to determine a word score based on a probability of a number of constructs. The number of constructs includes one or more paired tokens. The one or more paired tokens includes each token listed with other token at each topic. In an embodiment, the word score provides a degree of most relevant or associated words in each topic based on context for the raw dataset. For example, a probability of connectivity of word (0) to next word (1) is determined using replacement technique in topic 0.

$P$ (word (0) & word (1)=Number of constructs containing word (0) and word (1)/Number of constructs containing word (0)

The word score is determined for one or more topics are as mentioned below at Table 1:

TABLE 1

| Topic #0 | 'good', 'fit', 'great', 'look', 'colour', 'comfortable', 'wear', 'lovely', 'buy', 'value' | Probability Score | Word Score |
|---|---|---|---|
| good | Fit | [Number of constructs containing 'good' and 'fit']/Number of constructs containing 'good' = 0.002 | sum-up for 'good' = 0.178 |
| good | great | [Number of constructs containing 'good' and 'great']/Number of constructs containing 'good' = 0.03 | |
| good | look | [Number of constructs containing 'good' and 'look']/Number of constructs containing 'good' = 0.005 | |
| good | colour | [Number of constructs containing 'good' and 'colour']/Number of constructs containing 'good' = 0.026 | |
| good | comfortable | [Number of constructs containing 'good' and 'comfortable']/Number of constructs containing 'good' = 0.068 | |
| good | wear | [Number of constructs containing 'good' and 'wear']/Number of constructs containing 'good' = 0.025 | |
| good | lovely | [Number of constructs containing 'good' and 'lovely']/Number of constructs containing 'good' = 0.006 | |
| good | buy | [Number of constructs containing 'good' and 'buy']/Number of constructs containing 'good' = 0.009 | |
| good | value | [Number of constructs containing 'good' and 'value']/Number of constructs containing 'good' = 0.007 | |
| fit | great | [Number of constructs containing 'fit' and 'great']/Number of constructs containing 'fit' = 0.002 | sum-up for 'fit' |
| fit | look | [Number of constructs containing 'fit' and 'look']/Number of constructs containing 'fit' = 0.018 | |
| . . . | . . . | | |
| Topic #1 | 'wear', 'buy', 'good', 'comfortable', 'love', 'look', 'boot', 'comfy', 'shoe', 'warm' | Probability Score | Word Score |
| . . . | . . . | | |

An amount of one or more repetitive tokens in each topic are determined which is referred to as a litany index value. The litany index value is proportional to number of repetitive tokens.

for x=1 to k:

$$\text{Litany Index } LI(x) = \Sigma_{i=0}^{n} \log(\text{frequency of each token in topic})$$

where 'n' is number of words in each topic.

For example, if the litany index value is zero, that implies no duplication of words. Alternatively, if the litany index value is higher than zero, that implies more words are repeated.

For topic #0, log(frequency of 'good')=0 log(frequency of 'colour')=0 log(frequency of 'look')=0 log(frequency of 'fit')=0

. . .

log(frequency of 'really')=0

The litany index value for topic #0 is summation of log (frequency of each token in topic)=0.

The litany index value for one or more topics is as mentioned below at Table 2:

TABLE 2

| Topics | Topic Keywords | Litany index value |
|---|---|---|
| Topic #0 | 'good', 'fit', 'great', 'look', 'colour', 'comfortable', 'wear', 'lovely', 'buy', 'value' | 0 |
| Topic #1 | 'wear', 'buy', 'good', 'comfortable', 'love', 'look', 'boot', 'comfy', 'shoe', 'warm' | 0 |
| Topic #2 | 'comfortable', 'buy', 'great', 'love', 'colour', 'fit', 'great', 'soft', 'wear', 'wash' | 0.30103 |
| Topic #3 | 'wear', 'buy', 'look', 'bra', 'love', 'make', 'good', 'daughter', 'present', 'shoe' | 0 |
| Topic #4 | 'size', 'return', 'order', 'fit', 'look', 'good', 'long', 'buy', 'big', 'length' | 0 |

The topic score generation unit 206B is configured to determine a topic score for each topic based on a mean value of the word score subtracted by the corresponding litany index value for each topic. The topic score provides a degree of quality including one or more features i.e., how strong the words have contextual association, amount of redundancy of words in topic, and number of frequent entities etc., for one topic/concept in the raw dataset.

$$\text{Topic}(x)\_\text{score} = \text{Mean of word\_score} - \text{LI}(x)$$

The topic score for one or more topics is as mentioned below at Table 3:

TABLE 3

| Topic #0 | Probability Score | Word Score | Litany Index | Topic Score 0 |
|---|---|---|---|---|
| good, fit | [Number of constructs containing 'good' and 'fit']/Number of constructs containing 'good' = 0.002 | Sum-up for 'good' = 0.178 | 0 | Mean of word score − litany index = 0.487 |
| good, great | [Number of constructs containing 'good' and 'great']/Number of constructs containing 'good' = 0.03 | | | |
| ... | ... | | | |
| Fit, great | [Number of constructs containing 'fit' and 'great']/Number of constructs containing 'fit' = 0.002 | Sum-up for 'fit' = 0.216 | | |
| Fit, look | [Number of constructs containing 'fit' and 'look']/Number of constructs containing 'fit' = 0.018 | | | |
| ... | ... | | | |
| ... | ... | ... | | |
| ... | ... | Sum-up for 'value' = 0.51 | | |
| Topic #1 | Probability Score | Word Score | Litany Index value | Topic Score 1 |
| ... | ... | | 0 | Mean of word score − litany index = 0.585 |

TABLE 3-continued

| Topic #2 | Probability Score | Word Score | Litany Index value | Topic Score 2 |
|---|---|---|---|---|
| ... | ... | | 0.30103 | Mean of word score − litany index = 0.123 |
| ... | ... | | | |

The contiguity score generation unit 206C is configured to a contiguity score is determined based on a median value of the topic score. The contiguity score provides a degree of quality for different topics or different concepts based on the raw dataset. The contiguity score supports ranking and to distinguish an output for various number of topics (k). The connected topics identification unit 208 is configured to optimize the one or more topics (k) obtain one or more connected topics based on the contiguity score. Highest contiguity score among different value of k-'number of topics' is a best result. The highest contiguity score implies good quality of connected topics in the dataset. For example, consider a middle value of the processed dataset below which maximum score lies for the one or more topics. Therefore, a median of the generated score for one or more topics to obtain single final score.

```
for x = 1 to k:
    for i = 1 to n:
        for j= i+1 to n:
            P[word(i) & word(j)] = [Number of constructs
            containing word(i) & word(j)]/Number of constructs
            containing word(i)
            Word_Score(i) = Σⱼⁿ P[word(i) & word(j)]
        Litany Index LI(x) = Σᵢⁿ log (frequency of each token in topic)
        Topic(x)_score=Mean of Word_Score − LI(x)
Contiguity_Score = Median of Topic_Score
```

The contiguity score for one or more topics is as mentioned below at Table 4:

TABLE 4

| | Probability Score | Word Score | Litany index | Topic Score | Contiguity Score |
|---|---|---|---|---|---|
| Topic #0 | | | | | |
| | | | 0 | Mean of word score − litany index = 0.487 | Median of Topic Scores = 0.341 |
| Topic #1 | | | | | |
| ... | ... | | 0 | Mean of word score − litany index = 0.585 | |
| Topic #2 | | | | | |
| ... | ... | | 0.30103 | Mean of word score − litany index = 0.123 | |
| Topic #3 | | | | | |
| ... | ... | | 0.30103 | Mean of word score − litany index = 0.341 | |

TABLE 4-continued

| | Probability Score | Word Score | Litany index | Topic Score | Contiguity Score |
|---|---|---|---|---|---|
| Topic #4 | | | | | |
| ... | ... | | 0.30103 | Mean of word score − litany index = 0.312 | |

Figure 5:
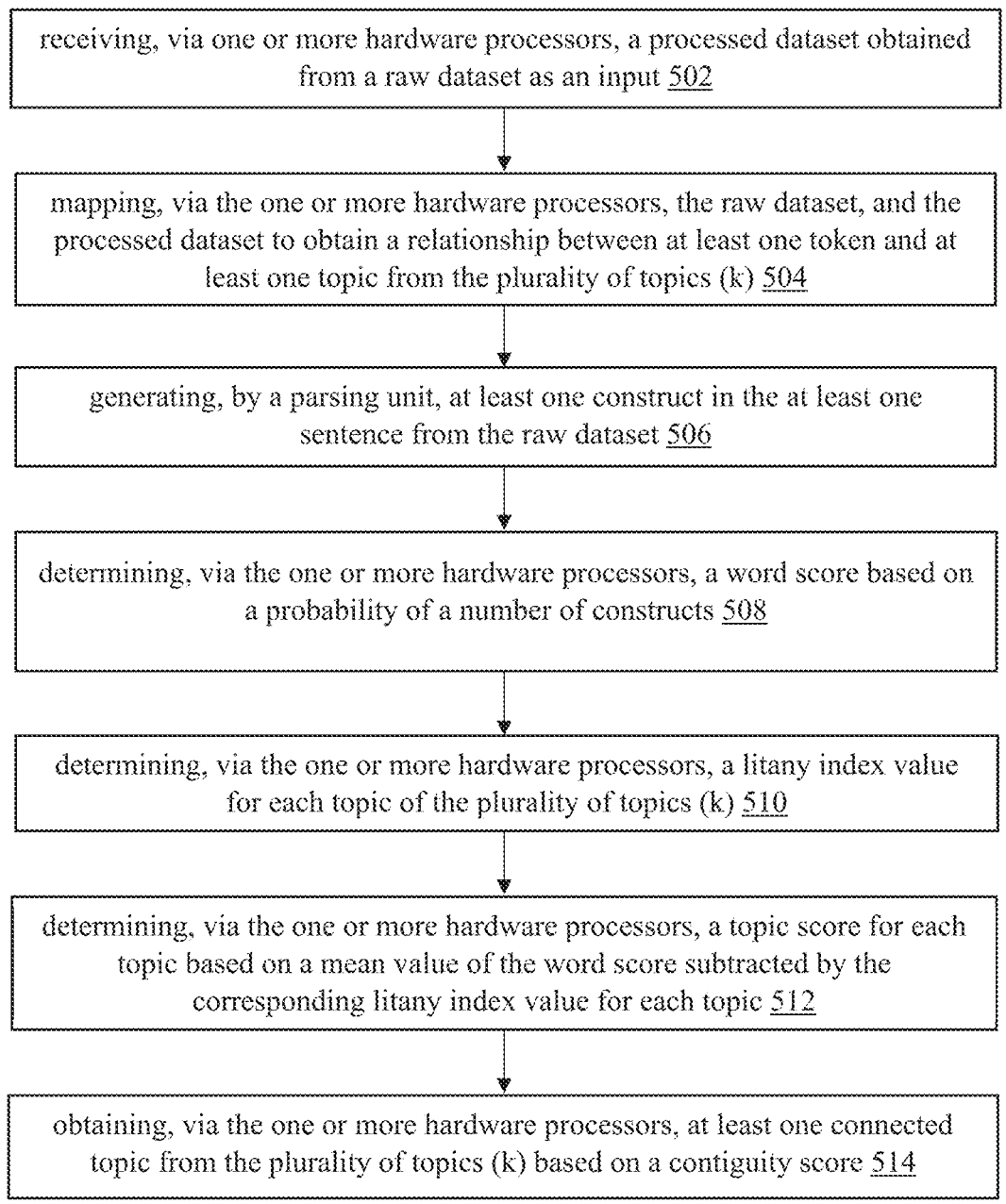
FIG. 5 is an exemplary flow diagram illustrating a method of optimizing one or more topics by the evaluation metrics, according to an embodiment of the present disclosure.

FIG. 5 is an exemplary flow diagram illustrating a method 500 of optimizing the one or more topics by the evaluation metrics, according to an embodiment of the present disclosure. In an embodiment, the system 100 comprises one or more data storage devices or the memory 104 operatively coupled to the one or more hardware processors 102 and is configured to store instructions for execution of steps of the method by the one or more processors 102. The flow diagram depicted is better understood by way of following explanation/description. The steps of the method of the present disclosure will now be explained with reference to the components of the system as depicted in FIGS. 1 and 2.

At step 502, the processed dataset obtained from the raw dataset is received as an input. The processed dataset corresponds to the one or more topic models. The one or more topic models includes the one or more topics (k). At step 504, the raw dataset and the processed dataset are mapped to obtain a relationship between each token and each topic from the one or more topics (k). The one or more tokens corresponds to the one or more words (n) present in one or more sentences from the raw dataset. At step 506, the one or more constructs is generated by the parsing unit 204 in the one or more sentences from the raw dataset. The one or more constructs corresponds to the one or more closely connected entity. The one or more closely connected entity corresponds to: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*). At step 508, the word score is determined based on a probability of a number of constructs. The number of constructs includes the one or more paired tokens. The one or more paired tokens includes each token listed with other token at each topic. At step 510, a litany index value is determined for each topic of the one or more topics (k). The litany index value corresponds to one or more repetitive tokens in each topic of the one or more topics (k). The litany index value is proportional to number of repetitive tokens. The number of at least one repetitive token is high if the litany index value is high. At step 512, the topic score for each topic is based on a mean value of the word score subtracted by the corresponding litany index value for each topic. The topic score corresponds to a degree of contextual association between the one or more tokens in each topic. At step 514, one or more connected topics from the one or more topics (k) based on a contiguity score. The contiguity score is determined based on a median value of the topic score. The contiguity score corresponds to a degree of contextual association between the one or more topics (k).

The embodiment of present disclosure herein addresses unresolved problems of selecting efficient evaluating metrics to determine closely connected topics. The embodiment thus provides an approach to optimize a plurality of topics by efficient evaluation metrics. The embodiment of present disclosure helps in determining contextually connected word for each entity in each phrase within a document/review irrespective of part-of-speech associated for each entity at granular level based on a syntactic structure of sentence. The relationship between words is captured in a subset of words or topics in the document. The claimed approach determines efficient topics out of different results based on an automated validation process which nullifies regular manual effort, thereby reliability on performance is improved. The performance of the evaluation metrics with respect to an evaluator shows enough statistical significance, or enough variance between score distributions, to be differentiated. This is needed in evaluating whether a model is better than another and helpful in determining performance rankings between one or more models.

The claimed approach can be extensively utilized with any application programming interface (API) and evaluation algorithm. A parsing technique can be implemented for lengthy sentences without any additional hardware requirement. Comparison of multiple scores from a model which is used in a word model's prototyping and development to avoid meaningless representations from conflicting properties that may arise from a polysemy of words. A similarity measure is computationally efficient as most models are created to solve computationally expensive downstream tasks. The claimed evaluation metrics are simple yet able to predict downstream performance of a model. The litany index measure is established to capture the amount of redundancy exists in the data. If the token scores in each topic is distributed in a skewed manner, then median norm identifies where half of data points i.e., topics are residing in asymmetrical range. This helps to distinguish and identify the optimized topic for different turnouts.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method (500), comprising:
   receiving, via one or more hardware processors, a processed dataset obtained from a raw dataset as an input, wherein the processed dataset corresponds to at least one topic model, wherein the at least one topic model comprises a plurality of topics (k) (502);

mapping, via the one or more hardware processors, the raw dataset, and the processed dataset to obtain a relationship between at least one token and at least one topic from the plurality of topics (k), wherein the at least one token corresponds to at least one word (n) present in at least one sentence from the raw dataset (504);

generating, by a parsing unit, at least one construct in the at least one sentence from the raw dataset, wherein the at least one construct corresponds to at least one closely connected entity (506);

determining, via the one or more hardware processors, a word score based on a probability of a number of constructs, wherein the number of constructs comprising a plurality of paired tokens (508);

determining, via the one or more hardware processors, a litany index value for each topic of the plurality of topics (k), wherein the litany index value corresponds to at least one repetitive token in each topic of the plurality of topics (k) (510);

determining, via the one or more hardware processors, a topic score for each topic based on a mean value of the word score subtracted by the corresponding litany index value for each topic (512), wherein the topic score corresponds to a degree of contextual association between a plurality of tokens in each topic; and obtaining, via the one or more hardware processors, at least one connected topic from the plurality of topics (k) based on a contiguity score (514).

2. The processor implemented method (500) as claimed in claim 1, wherein the at least one closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*).

3. The processor implemented method (500) as claimed in claim 1, wherein the plurality of paired tokens comprises each token listed with other token at each topic.

4. The processor implemented method (500) as claimed in claim 1, wherein the litany index value is proportional to number of at least one repetitive token, and wherein the number of at least one repetitive token is high if the litany index value is high.

5. The processor implemented method (500) as claimed in claim 1, wherein the contiguity score is determined based on a median value of the topic score, and wherein the contiguity score corresponds to a degree of contextual association between the plurality of topics (k).

6. A system (100), comprising:
a memory (104) storing instructions;
one or more communication interfaces (106); and
one or more hardware processors (102) coupled to the memory (104) via the one or more communication interfaces (106), wherein the one or more hardware processors (102) are configured by the instructions to:
receive, dataset obtained from a raw dataset as an input, wherein the processed dataset corresponds to at least one topic model, wherein the at least one topic model comprises a plurality of topics (k);
map, the raw dataset, and the processed dataset to obtain a relationship between at least one token and at least one topic from the plurality of topics (k), wherein the at least one token corresponds to at least one word (n) present in at least one sentence from the raw dataset;

generate, at least one construct in the at least one sentence from the raw dataset, wherein the at least one construct corresponds to at least one closely connected entity;

determine, a word score based on a probability of a number of constructs, wherein the number of constructs comprising a plurality of paired tokens;

determine, a litany index value for each topic of the plurality of topics (k), wherein the litany index value corresponds to at least one repetitive token in each topic of the plurality of topics (k);

determine, a topic score for each topic based on a mean value of the word score subtracted by the corresponding litany index value for each topic, wherein the topic score corresponds to a degree of contextual association between a plurality of tokens in each topic; and obtain, at least one connected topic from the plurality of topics (k) based on a contiguity score.

7. The system (100) as claimed in claim 6, wherein the at least one closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*).

8. The system (100) as claimed in claim 6, wherein the plurality of paired tokens comprises each token listed with other token at each topic.

9. The system (100) as claimed in claim 6, wherein the litany index value is proportional to number of at least one repetitive token, and wherein the number of at least one repetitive token is high if the litany index value is high.

10. The system (100) as claimed in claim 6, wherein the contiguity score is determined based on a median value of the topic score, and wherein the contiguity score corresponds to a degree of contextual association between the plurality of topics (k).

11. One or more non-transitory machine-readable information storage mediums comprising one or more instructions which when executed by one or more hardware processors causes:

receiving, a processed dataset obtained from a raw dataset as an input, wherein the processed dataset corresponds to at least one topic model, wherein the at least one topic model comprises a plurality of topics (k);

mapping, the raw dataset, and the processed dataset to obtain a relationship between at least one token and at least one topic from the plurality of topics (k), wherein the at least one token corresponds to at least one word (n) present in at least one sentence from the raw dataset;

generating, by a parsing unit, at least one construct in the at least one sentence from the raw dataset, wherein the at least one construct corresponds to at least one closely connected entity;

determining, a word score based on a probability of a number of constructs, wherein the number of constructs comprising a plurality of paired tokens;

determining, a litany index value for each topic of the plurality of topics (k), wherein the litany index value corresponds to at least one repetitive token in each topic of the plurality of topics (k);

determining, a topic score for each topic based on a mean value of the word score subtracted by the corresponding litany index value for each topic, wherein the topic score corresponds to a degree of contextual association between a plurality of tokens in each topic; and obtaining, at least one connected topic from the plurality of topics (k) based on a contiguity score.

12. The one or more non-transitory machine-readable information storage mediums of claim 11, wherein the at least one closely connected entity corresponds to at least one of: (i) a verb (VB*), (ii) a conjunction (CC), (iii) a cardinal number (CD), (iv) an adverb (RB), (v) a particle (RP), (vi) a preposition (IN), (vii) a possessive ending (POS), (viii) an adjective (JJ*), (ix) a personal pronoun (PRP), and (x) a noun (NN*).

13. The one or more non-transitory machine-readable information storage mediums of claim 11, wherein the plurality of paired tokens comprises each token listed with other token at each topic.

14. The one or more non-transitory machine-readable information storage mediums of claim 11, wherein the litany index value is proportional to number of at least one repetitive token, and wherein the number of at least one repetitive token is high if the litany index value is high.

15. The one or more non-transitory machine-readable information storage mediums of claim 11, wherein the contiguity score is determined based on a median value of the topic score, and wherein the contiguity score corresponds to a degree of contextual association between the plurality of topics (k).

* * * * *